(12) United States Patent
Kim

(10) Patent No.: US 7,721,561 B2
(45) Date of Patent: May 25, 2010

(54) APPARATUS AND METHOD FOR CONTROLLING FAN OPERATION

(75) Inventor: Yang Hoon Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 1266 days.

(21) Appl. No.: 11/043,269

(22) Filed: Jan. 27, 2005

(65) Prior Publication Data

US 2006/0006246 A1 Jan. 12, 2006

(30) Foreign Application Priority Data

Jul. 9, 2004 (KR) ...................... 10-2004-0053278

(51) Int. Cl.
*F25D 17/04* (2006.01)
*H05K 7/20* (2006.01)
*G05D 23/00* (2006.01)

(52) U.S. Cl. .......................... 62/186; 318/471; 361/695; 700/299

(58) Field of Classification Search ................... 62/186; 700/299, 300, 277, 278; 361/695, 688, 687; 318/471, 268
See application file for complete search history.

(56) References Cited

U.S. PATENT DOCUMENTS 6,414,843 B1 * 7/2002 Takeda ....................... 361/687

6,467,696 B2 * 10/2002 Riley et al. ................. 236/49.3
6,757,592 B1 * 6/2004 Henderson et al. .......... 700/299

FOREIGN PATENT DOCUMENTS

CN 1622406 6/2005
JP 04198642 A * 7/1992

* cited by examiner

*Primary Examiner*—Chen-Wen Jiang
(74) *Attorney, Agent, or Firm*—Ked & Associates LLP

(57) ABSTRACT

An apparatus and method for controlling fan operation in a system having a fan are provided. The apparatus includes a temperature sensor configured to detect at least one internal temperature of the system as a whole or component devices thereof, a power supply configured to convert one or more different input powers into predetermined voltage levels and supply the voltage levels to the fan, and a controller connected to the temperature sensor and the power supply and configured to control operation of the fan, wherein the controller controls fan operation based on a fan control mode selected by a user and the sensed at least one internal temperature. The method includes selecting a fan control mode from a plurality of fan control modes, detecting at least one internal temperature of the system as a whole or component devices thereof, controlling operation of the fan based on the selected fan control mode and the detected at least one internal temperature, including comparing the detected at least one internal temperature with a preset temperature, and if the detected temperature is lower than the preset temperature, decreasing a preset fan operation speed. Noise and power consumption can be minimized by controlling the fan operation depending on the specific states of the system.

2 Claims, 5 Drawing Sheets

Fig.3
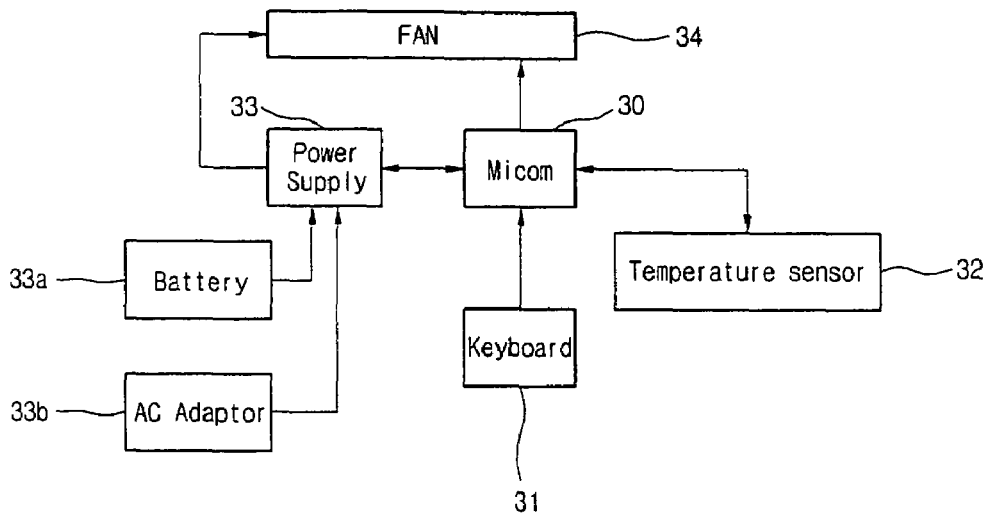
Fig.4
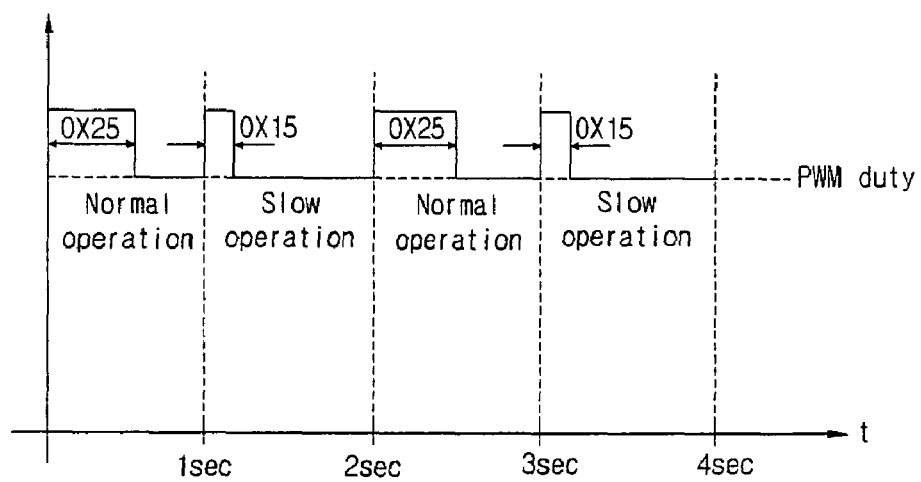
Fig.5A
| Fan operation state | Fan operation speed | Hexadecimal value | Remarks |
|---|---|---|---|
| Normal speed | 2500 rpm | 0X25 | |
| Speed lower than normal speed | 150 rpm | 0X15 | Speed can be subdivided |
| Spin-up operation | 3500 rpm | 0X35 | |

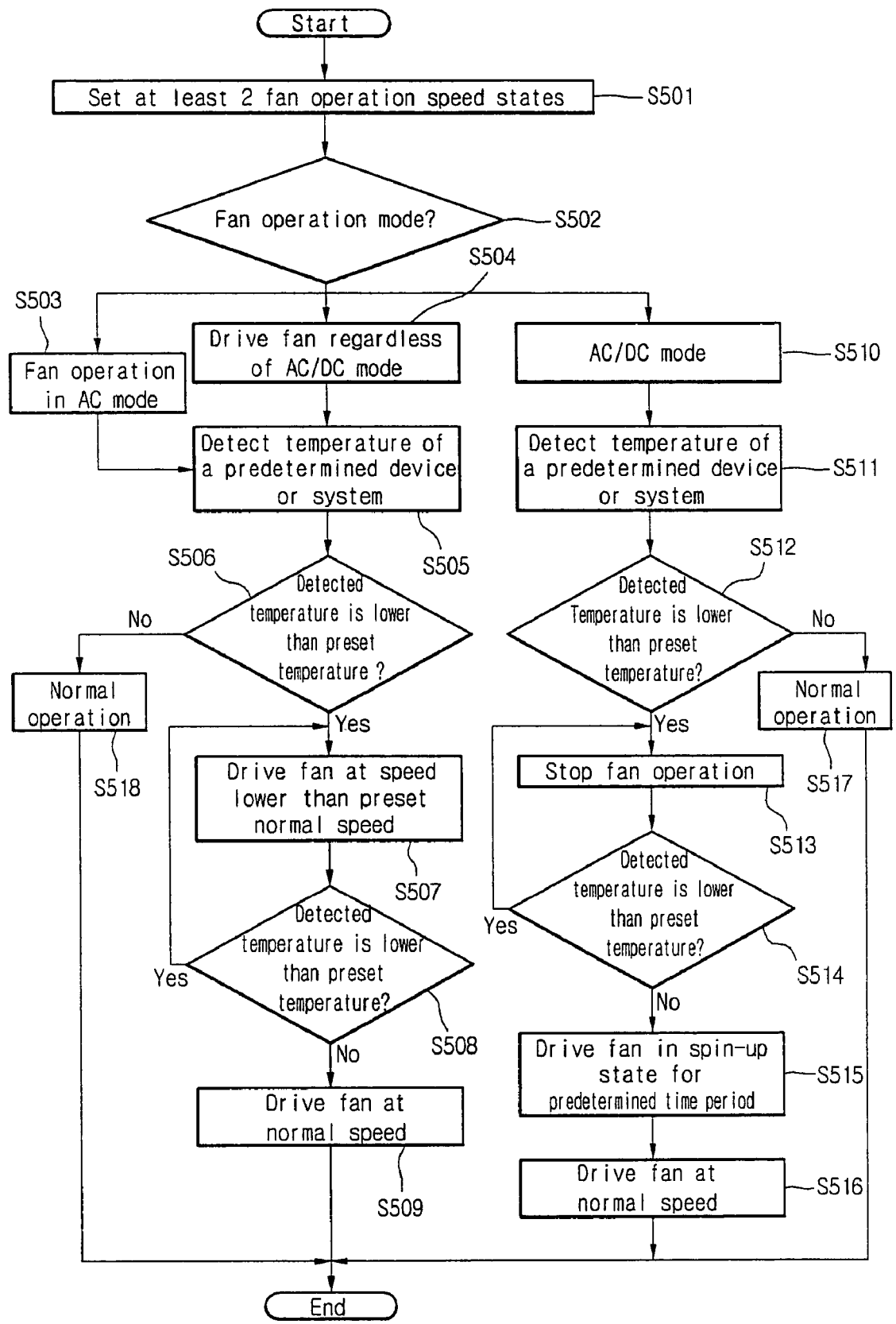

APPARATUS AND METHOD FOR CONTROLLING FAN OPERATION

BACKGROUND OF THE INVENTION

1. Field of the Invention

The invention relates to an apparatus and method for controlling fan operation.

2. Background of the Related Art

FIG. 1 is a block diagram of an apparatus for controlling a fan operation in a portable device. As shown in FIG. 1, the apparatus includes an input unit 11 (for example, a keyboard), a fan 14 for blowing and heating/cooling operations, a temperature sensor 12 for detecting system temperature, a power supply 13, and a microcomputer 10 connected to the above elements to control on/off operations of the fan 10 by using the detected temperature. Since a portable device, such as a notebook computer, generates a large amount of heat, the fan is used to remove the heat.

When the notebook is in a power-on state, a large amount of heat is generated even when the notebook works little or does not work, so that the fan is operated periodically. That is, the fan repeats a stop operation and a temporary rotation operation. If the fan is rotated depending on the above operation mode, an amount of heat is rapidly removed so that an internal temperature of the notebook computer falls to some degree.

FIG. 2 illustrates a control state of the fan operation. As shown in FIG. 2, the fan operation of the notebook computer is controlled by pulse width modulation (PWM), which is dependent on states of peripheral devices. That is, the fan repeats a normal operation, a stop operation, and a spin-up operation. The spin-up operation is an operation that allows the fan to rotate at a speed higher than a normal speed.

In the case of the normal operation, for example, ~2500 rpm, a value corresponding to a hexadecimal value of 0×25 is set to firmware program of the microcomputer. In the case of the spin-up operation, for example, ~3500 rpm, a value corresponding to a hexadecimal value of 0×2C is set to firmware program of the microcomputer. That is, if PWM duty is larger, the fan rotates at a high speed. Meanwhile, if PWM duty is smaller, the fan rotates at a low speed.

When the fan starts to rotate from a stop state, the PWM duty is momentarily increased larger than the PWM duty of the normally rotating fan. At this point, the duration time (about 1 second) is called "SpinUp Time". When the fan starts to rotate, the PWM duty is set normally.

In the case where the stopped fan is rotated, if the PWM duty of the normal fan speed is applied, the fan may not be rotated due to characteristics of the fan. Therefore, the fan is rotated during a predefined duration time according to the spin-up operation.

In this case, however, the user may hear severe noise. That is, the noise of the fan is relatively increased due to the periodic rotation and stop operations. In addition, when the stopped fan starts to rotate, the PWM duty is increased due to the spin-up operation and thus the fan rotates almost instantaneously at a high speed. The noise occurring at that time is relatively large. Further, the fan operation does not change depending on the specific operation state of the system.

SUMMARY OF THE INVENTION

An object of the invention is to solve at least the above problems and/or disadvantages and to provide at least the advantages described hereinafter.

To achieve at least these objects, in whole or in part, and in accordance with the purposes of the invention, as embodied and broadly described herein, there is provided an apparatus for controlling fan operation in a system having a fan in accordance with an embodiment of the invention that includes a temperature sensor configured to detect at least one internal temperature of the system as a whole or component devices thereof, a power supply configured to convert one or more different input powers into predetermined voltage levels and supply the voltage levels to the fan, and a controller connected to the temperature sensor and the power supply and configured to control operation of the fan, wherein the controller controls fan operation based on a fan control mode selected by a user and the sensed at least one internal temperature.

To further achieve at least these objects, in whole or in part, and in accordance with the purposes of the invention, as embodied and broadly described herein, there is provided a method for controlling fan operation in a system having a fan in accordance with an embodiment of the invention that includes selecting a fan control mode from a plurality of fan control modes, detecting at least one internal temperature of a system or component devices thereof, controlling operation of the fan based on the selected fan control mode and the detected at least one internal temperature, including comparing the detected at least one internal temperature with a preset temperature, and if the detected temperature is lower than the preset temperature, decreasing a preset fan operation speed.

To further achieve at least these objects, in whole or in part, and in accordance with the purposes of the invention, as embodied and broadly described herein, there is provided a method for controlling fan operation in a system having a fan in accordance with an embodiment of the invention that includes selecting a fan operation mode based on at least two system operation modes, detecting at least one internal temperature of a system or component devices thereof, controlling operation of the fan based on the selected fan operation mode and the detected at least one internal temperature, including comparing the detected at least one internal temperature with a preset temperature, and if the detected temperature is lower than the preset temperature, stopping a preset fan operation speed.

To further achieve at least these objects, in whole or in part, and in accordance with the purposes of the invention, as embodied and broadly described herein, there is provided a method for controlling fan operation in a system having a fan in accordance with an embodiment of the invention that includes selecting a fan operation mode based on at least two system operation modes, detecting at least one internal temperature of a system or component devices thereof, controlling operation of the fan based on the selected fan operation mode and the detected at least one internal temperature, including determining whether the fan has rotated, detecting an internal temperature of system, comparing the detected internal temperature with a preset temperature, if the detected internal temperature is lower than the preset temperature, driving the fan at a speed lower than a preset normal speed, detecting again the internal temperature of the system and comparing the redetected temperature with the preset temperature, and if the redetected temperature is higher than the preset temperature, driving the fan at a normal speed.

To achieve at least these objects, in whole or in part, and in accordance with the purposes of the invention, as embodied and broadly described herein, there is provided an apparatus for controlling fan operation in a system having a fan in accordance with an embodiment of the invention that includes a temperature sensor configured to detect at least one internal temperature of the system as a whole or component devices thereof, and a controller connected to the temperature sensor and configured to control operation of the fan, wherein the controller controls operation of the fan based on a selected fan operation mode and the detected at least one internal temperature, and further determines whether the fan has rotated, compares the detected internal temperature with a preset temperature, if the detected internal temperature is lower than the preset temperature, drives the fan at a speed lower than a preset normal speed, again compares the internal temperature with the preset temperature, and if the redetected temperature is higher than the preset temperature, driving the fan at a normal speed.

To achieve at least these objects, in whole or in part, and in accordance with the purposes of the invention, as embodied and broadly described herein, there is provided an apparatus for controlling fan operation in a system having a fan in accordance with an embodiment of the invention that includes a temperature sensor configured to detect at least one internal temperature of the system as a whole or component devices thereof, a controller connected to the temperature sensor, wherein the controller controls operation of the fan based on a selected fan operation mode and the detected at least one internal temperature, and further compares the detected at least one internal temperature with a preset temperature, and if the detected temperature is lower than the preset temperature, stops a preset fan operation speed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a block diagram of an apparatus for controlling fan operation in a system having a fan according to an embodiment of the invention;

FIG. 4 is a graph that illustrates a control state of fan operation in accordance with an embodiment of the invention;

FIG. 5A is a chart of fan operational speed and hexadecimal value for each of a plurality of fan operation states;

FIG. 5B is a flowchart illustrating selection of a fan operation mode according to an embodiment of the invention;

DETAILED DESCRIPTION OF PREFERRED EMBODIMENTS

Figure 1:
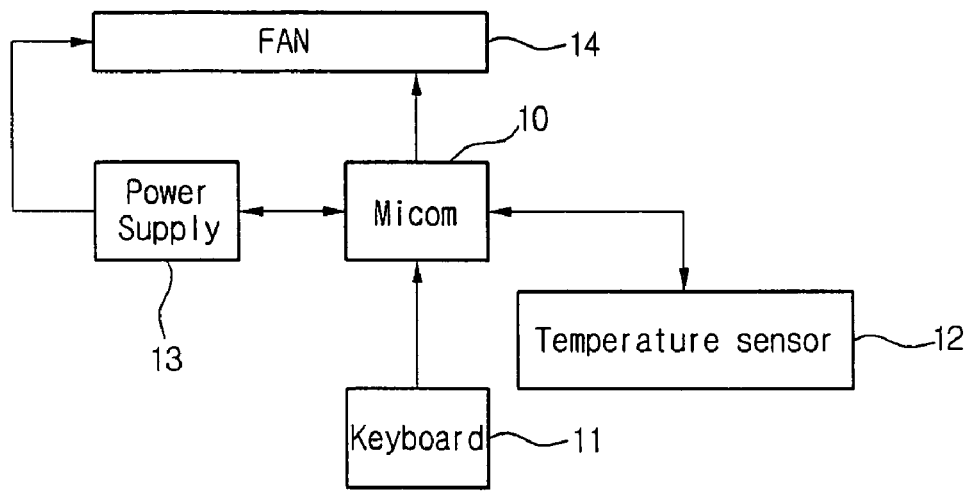
FIG. 1 is a block diagram of a related art apparatus for controlling fan operation in a portable device.
Figure 2:
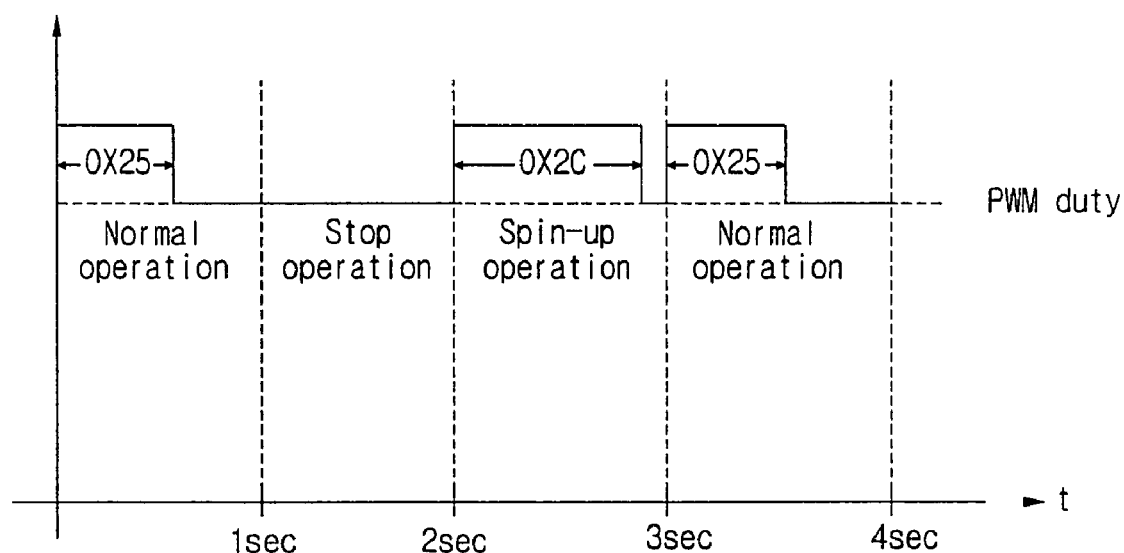
FIG. 2 is a graph that illustrates a control state of fan operation in accordance with the related art.

Now, an apparatus and method for controlling fan operation in accordance with embodiments of the invention will be discussed in detail with reference to the drawings, in which like reference numerals designate like elements.

FIG. 3 is a block diagram of an apparatus for controlling fan operation in a system having a fan according to an embodiment of the invention. The system may be a portable device, such as a notebook computer. Referring to FIG. 3, the apparatus for controlling fan operation in a system having an input unit 31 (for example, a keyboard) and a fan 34 further includes a temperature sensor 32, a power supply 33, and a microcomputer 30.

The temperature sensor 32 detects at least one internal temperature (for example, a temperature of the CPU) or the system as a whole. The power supply 33 converts a plurality of input power (from, for example, a battery 33a, and an AC adaptor 33b) into predetermined voltage levels.

The microcomputer 30 is connected to the above-described elements and controls the fan 34 to operate at a preset normal speed or at a speed lower than the normal speed in a control mode or a power mode, considering the temperature detected by the temperature sensor. Even when the detected temperature is lower than a preset temperature, the microcomputer controls the fan to operate at a speed lower than the preset normal speed without stopping the fan operation.

FIG. 4 illustrates a control state of fan operation according an embodiment of the invention. Referring to FIG. 4, the fan operation of the system, such as a portable device, for example, a notebook computer, is controlled by pulse width modulation (PWM). Even when a detected temperature is lower than a preset temperature during the normal operation (0×25), the fan continuously operates at a preset speed (0×15) lower than the normal speed without stopping.

The operation speed can be subdivided according to the user's setup. In addition, the operation speed of the fan can be adjusted according to a magnitude of the power supply voltage.

FIG. 5A is a chart of fan operational speed and hexadecimal value for each of a plurality of fan operation states and FIG. 5B is a flowchart illustrating selection of fan operation mode according to an embodiment of the invention.

If the internal temperature of the system or the temperature of the device is lower than a specific temperature, the fan operates at a rotation (for example, 0×15) less than a minimum rotation (for example, 0×20) of a related art notebook PC without stopping the fan operation. That is, while the fan according to the related art may be stopped, the fan according to embodiments of the invention always rotates.

Although the fan always rotates, the fan rotates at a low speed, such that the uses cannot or almost cannot hear any noise. Also, the temperature does not increase significantly. Further, since the fan always rotates at a low speed, the related art spin-up operation is not required. Therefore, in the case of normal operation, the noise is relatively small.

Meanwhile, the noise and the power consumption may increase if the fan always rotates. In order to solve this problem, embodiments of the invention change the fan operation mode depending on the applied voltages.

For example, the fan may be controlled to rotate always in an AC mode, the fan can be controlled to rotate always regardless of AC/DC modes, and the fan can be controlled to repeat the rotation operation and the stop operation.

The above operation will be described with reference to FIG. 5B.

At least two fan operation speed states are set, in step S501, as shown in FIG. 5B. Referring to the chart in FIG. 5A, the fan may be set to a normal speed operation (~2500 rpm), a slow speed operation (~150 rpm (0×15)), and a speed-up operation (~3500 rpm (0×2C)). Of course, the fan operation speed states may be further subdivided.

The microcomputer 30 selects the fan control mode based on user selection, in step S502. The fan control mode may include a fan operation when the input voltage is in the AC mode, in step S503, a fan operation regardless of whether the input voltage is in the AC/DC mode, in step S504, and a fan operation when the input voltage is in the AC/DC mode, in step S510.

When the input voltage is at least one of AC and DC, the temperature sensor detects at least one internal temperature of the device or the system, in step S505. Then, the detected temperature is compared with the preset temperature, in step S506. If the detected temperature is higher than a preset temperature, the fan is driven normally, in step S518. However, if the detected temperature is lower than the preset temperature, the fan speed is reduced down to a preset fan speed, such that the fan can continuously operate at a speed lower than the preset normal speed, in step S507. If a redetected temperature is higher than the preset temperature due to heat generated by increase of loads, such as system devices, the fan speeds up such that the fan operates at normal speed, in steps S508, S509.

When the input voltage is DC, the fan speed can be controlled, in step S510. That is, when the input voltage is DC, the temperature sensor detects at least one internal temperature of the device and the system, in step S511.

The detected temperature is compared with a preset temperature, in step S512. If the detected temperature is higher than the preset temperature, the fan is driven normally, in step S517. On the other hand, if the detected temperature is lower than the preset temperature, the fan operation is stopped, in step S513. Then, if a redetected temperature is higher than the preset temperature, the fan operates in a spin-up state for a predetermined time, in step S515. After the spin-up operation, the fan is driven at the normal speed, in step S516.

As described above, the fan operation speed (for example, a normal speed, a speed lower than the normal speed) is set with two or more modes. During the normal speed, the internal temperature of predetermined devices or the system as a whole is detected by the temperature sensor.

The detected temperature is compared with the preset temperature. If the detected temperature is lower than the preset temperature, the fan is driven at a speed lower than the normal speed. Then, the temperature of the system is again detected and the redetected temperature is compared with the preset temperature. In this manner, the process of determining the fan operation speed is repeated.

Figure 6:
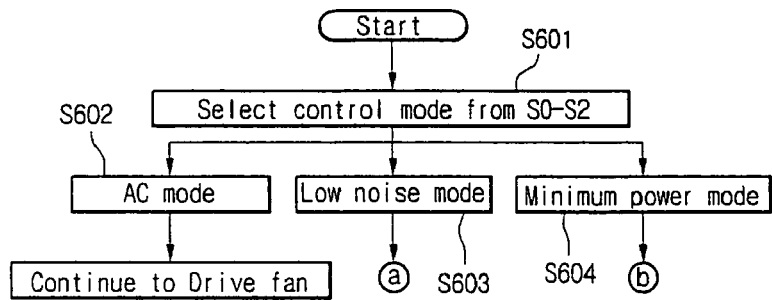
FIG. 6 is a flowchart illustrating selected modes that allow a fan to operate in specific operation states (S0, S1 and S2) of the system in accordance with an embodiment of the invention.

FIG. 6 is a flowchart illustrating selected modes that allow the fan to operate in specific operation states (S0, S1 and S2) of the system in accordance with an embodiment of the invention. S0, S1 and S2 are classified by the user depending on the operation state of the system. S0, S1, and S2 represent a normal state, a slow state, and a lower slow state, respectively.

Referring to FIG. 6, the fan operation in the S0 state is changed depending on the selection of an AC mode, a low noise mode and a minimum power mode. If the user selects the AC mode, the fan continues to rotate.

The S1 and S2 states are used only in the minimum power mode. In the low noise mode, the fan speed is controlled depending on the temperature of the system or a particular device, such as a CPU or a peripheral chipset.

Figure 7:
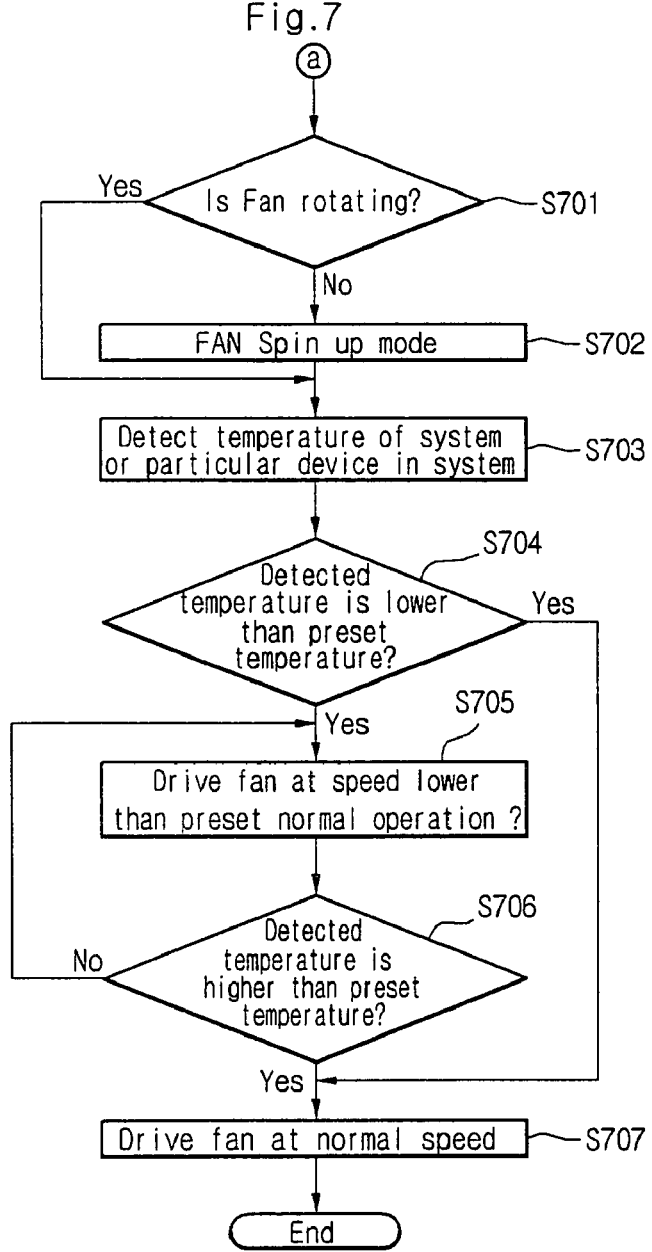
FIG. 7 is a flowchart illustrating operation when the user selects a low noise mode in the S0 state.

FIG. 7 is a flowchart illustrating operation when the user selects the low noise mode in the S0 state according to an embodiment of the invention. Referring to FIG. 7, the microcomputer determines whether the fan has rotated or not, in step S701. In step S701, if the fan is not in a rotation state, the fan is driven in a spin-up state during a predetermined time, in step S702. When the fan is in the rotation state in step S701 or after the fan is driven in the spin-up state in step S702, the internal temperature of the system is detected by the temperature sensor, in step S703.

The detected internal temperature is compared with the preset temperature, in step S704. If the internal temperature is lower than the preset temperature, the fan is driven at a speed lower than the preset normal speed, in step S705.

The internal temperature of the system is detected again while the fan is rotating at the speed lower than the preset normal speed, and then the redetected temperature is compared with the preset temperature, in step S706. If the redetected temperature is still lower than the preset temperature, the fan is driven at a speed lower than the preset normal speed.

On the other hand, if the detected internal temperature is higher than the preset temperature in step S704, or if the redetected internal temperature is higher than the preset temperature in step S706, the fan is driven normally to decrease the internal temperature to below the preset temperature, in step S707.

Figure 8:
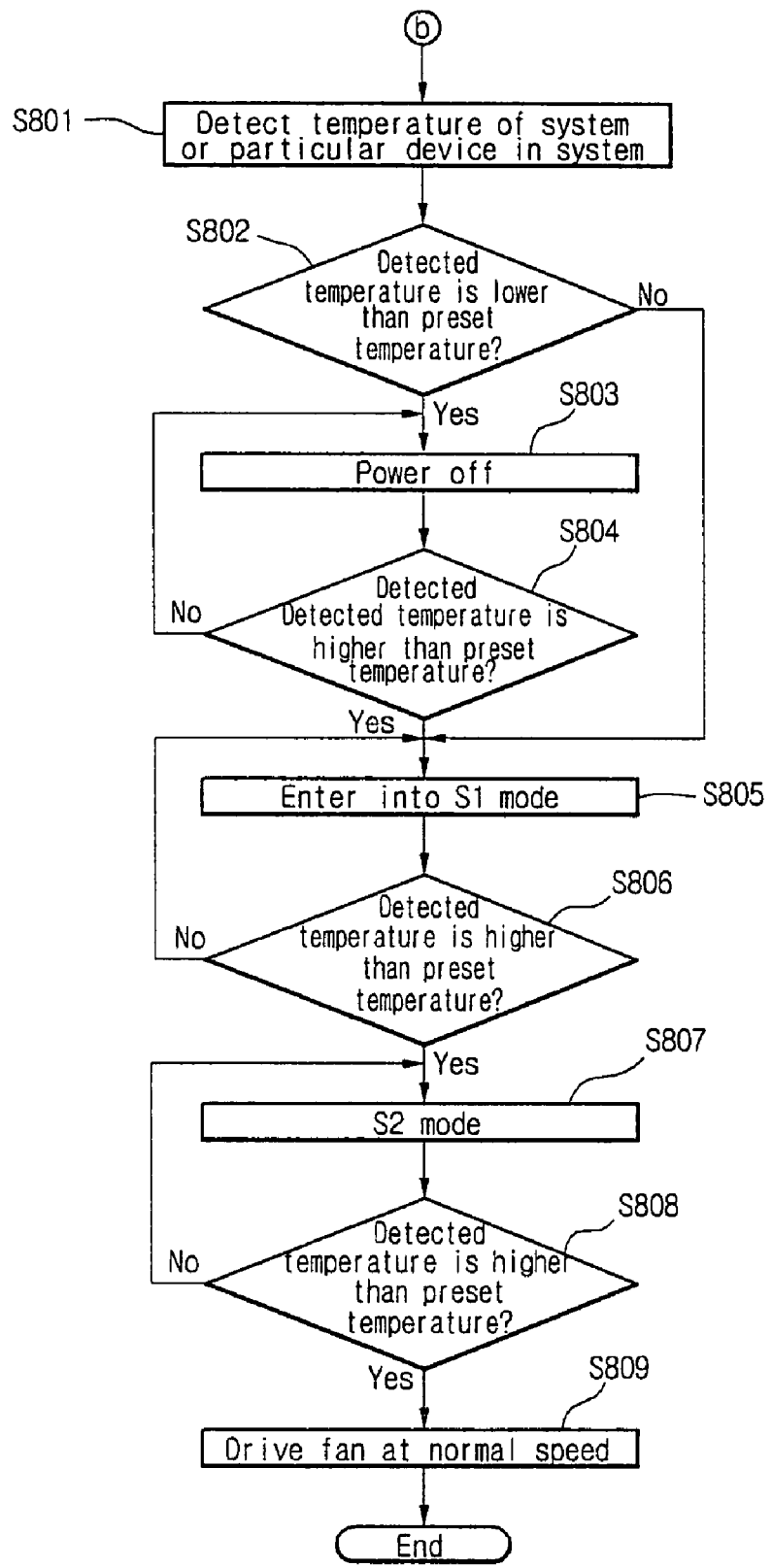
FIG. 8 is a flowchart illustrating operation when the user selects a minimum power mode in the S1/S2 state.

FIG. 8 is a flowchart illustrating operation when a user selects a minimum power mode in the S1/S2 state. The internal temperature of the system is detected by the temperature sensor, in step S801.

The detected internal temperature is compared with the preset temperature, in step S802. If the detected internal temperature is lower than the preset temperature, the power of the fan is cut off, in step S803.

The internal temperature of the system is detected again while the operation of the fan is off in step S803, and the detected internal temperature is compared with the preset temperature, in step S804. In step S804, if the detected internal temperature is higher than the preset temperature, the system is forced to enter the S1 mode (Sleep mode). In this manner, the number of the devices operating in the system decreases, such that heat generated inside the system is reduced, in step S805.

Meanwhile, in step S804, if the detected internal temperature is still lower than the preset temperature, the fan continues to maintain the power-off state. After the system is changed into the S1 mode in step S805, the internal temperature of the system is detected again and the detected internal temperature is compared with the preset temperature, in step S806.

In step S806, if the detected internal temperature is higher than the preset temperature, the system is forced to enter the S2 mode (lower sleep mode). In this manner, the number of the devices operating in the system decreases, such that heat generated inside the system is reduced, in step S807. On the other hand, in step S806, if the detected internal temperature is lower than the preset temperature, the fan continues to maintain the S1 mode state.

After the system is changed into the S2 mode in step S807, the internal temperature of the system is detected again and the detected internal temperature is compared with the preset temperature, in step S808. In step S808, if the detected internal temperature is higher than the preset temperature, the fan is driven normally to decrease the internal temperature to below the preset temperature, in step S809. On the other hand, in step S808, if the detected internal temperature is lower than the preset temperature, the fan continues to maintain the S2 mode state.

As described above, at least one internal temperature of the portable computer and the components thereof is checked and then compared with the preset temperature. If the detected internal temperature is lower than the preset temperature, the fan is driven at the speed lower than the preset normal speed.

In addition, the fan may operate in the specific operation states S0, S1 and S2, depending on the respective modes selected by the user. Accordingly, if the detected internal temperature of the system is lower than the preset temperature, the fan continues to operate at the preset lowest speed, such that the noise from the fan operation can be reduced.

The noise reduction and the power consumption can be appropriately considered by controlling the fan operation depending on the kind of input voltage. In addition, the fan operation can be controlled according to the operation modes, which are dependent on the system characteristics.

The apparatus and method for controlling fan operation according to embodiments of the invention provide at least the following advantages.

The apparatus and method for controlling fan operation according to embodiments of the invention reduce noise by driving the fan at a speed lower than a preset speed if at least one internal temperature of the system and/or the components thereof is lower than a preset temperature. Further, the apparatus and method for controlling fan operation according to embodiments of the invention control the fan depending on at least one of the kind of input power and the selected mode. Additionally, the apparatus and method for controlling fan operation according to embodiments of the invention provide various operation modes by selecting fan operation depending on the specific operation states of the system.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling fan operation in a system having a fan, the method comprising:
   selecting a fan operation mode based on at least two system operation modes;
   detecting at least one internal temperature of the system as a whole or component devices thereof;
   controlling operation of the fan based on the selected fan operation mode and the detected at least one internal temperature, including:
      comparing the detected at least one internal temperature with a preset temperature; and
      if the detected temperature is lower than the preset temperature, stopping a preset fan operation speed;
   detecting again the internal temperature of the system while the operation of the fan is off and comparing the detected internal temperature with the preset temperature;
   if the detected internal temperature is higher than the preset temperature, forcing the system to enter a first specific mode;
   after the system is changed into the first specific mode, detecting again the internal temperature of the system and comparing the detected internal temperature with the preset temperature;
   if the detected internal temperature is higher than the preset temperature, forcing the system to enter a second specific mode;
   after the system is changed into the second specific mode, detecting again the internal temperature of the system and comparing the detected internal temperature with the preset temperature;
   if the detected internal temperature is higher than the preset temperature, driving the fan normally; and
   if the internal temperature detected while the operation of the fan is off is lower than the preset temperature, maintaining the power-off state; and
   if the internal temperature detected after the system is changed into the first specific mode is lower than the preset temperature, maintaining the first specific mode, wherein an operation speed of the fan is controlled with at least one of a speed up status having ~3500 rpm, a normal status having ~2500 rpm, or a slow status having ~150 rpm.

2. The method according to claim 1, further comprising:
   if the internal temperature detected after the system is changed into the second specific mode is lower than the preset temperature, maintaining the second specific mode.

* * * * *